United States Patent [19]

Zimmerman et al.

[11] 4,442,238
[45] Apr. 10, 1984

[54] AROMATIC AMIDE POLYOLS FOR RIGID POLYURETHANE FOAMS

[75] Inventors: Robert L. Zimmerman; George P. Speranza, both of Austin, Tex.

[73] Assignee: Texaco Inc., White Plains, N.Y.

[21] Appl. No.: 443,822

[22] Filed: Nov. 22, 1982

[51] Int. Cl.³ .................... C08J 11/04; C08G 18/14; C08G 63/02; C08G 63/18

[52] U.S. Cl. ..................... 521/164; 252/182; 528/308.1; 528/297; 521/172; 521/131; 521/167; 521/48.5; 521/173; 560/89; 560/92; 560/93

[58] Field of Search .............. 521/164, 172, 131, 167, 521/48.5, 173; 252/182; 528/308.1, 297; 560/89, 92, 93

[56] References Cited

U.S. PATENT DOCUMENTS

| | | | |
|---|---|---|---|
| 2,683,730 | 7/1954 | Seeger et al. | 260/453 P |
| 2,834,748 | 5/1958 | Bailey et al. | 252/49.6 |
| 2,846,458 | 8/1958 | Haluska | 556/445 |
| 2,917,480 | 12/1959 | Bailey et al. | 525/477 |
| 2,948,757 | 8/1960 | Pruitt et al. | 568/624 |
| 2,950,263 | 8/1960 | Abbotson et al. | 521/129 |
| 2,965,615 | 12/1960 | Tess | 525/123 |
| 3,000,963 | 11/1961 | Hock et al. | 568/621 |
| 3,012,008 | 12/1961 | Lister | 528/67 |
| 3,072,582 | 1/1963 | Frost | 521/167 |
| 3,297,597 | 1/1967 | Edwards et al. | 521/166 |
| 3,344,162 | 9/1967 | Rowton | 260/453 PH |
| 3,362,979 | 1/1968 | Bentley | 260/453 R |
| 3,647,759 | 3/1972 | Walker | 528/296 |
| 4,094,828 | 6/1978 | Klein | 521/167 |
| 4,137,265 | 1/1979 | Edwards et al. | 564/388 |
| 4,223,068 | 9/1980 | Carlstrom et al. | 428/304.4 |
| 4,237,238 | 12/1981 | De Giuiseppi | 521/131 |
| 4,246,364 | 1/1981 | Koehler et al. | 521/167 |
| 4,246,365 | 1/1981 | Wiedermann et al. | 521/172 |
| 4,309,532 | 1/1982 | Cuscurida et al. | 528/103 |

*Primary Examiner*—John Kight, III
*Assistant Examiner*—M. L. Moore
*Attorney, Agent, or Firm*—Jack H. Park; Kenneth R. Priem; David L. Mossman

[57] ABSTRACT

Mixtures of aromatic polyols containing amide and ester functionalities suitable for use in rigid foams prepared by reacting a phthalic acid residue with an amino alcohol and subsequent alkoxylation are described. These novel polyols may be blended with conventional polyols to yield rigid foams with better flammability resistance as compared with foams made from conventional polyols alone.

32 Claims, No Drawings

AROMATIC AMIDE POLYOLS FOR RIGID POLYURETHANE FOAMS

CROSS-REFERENCES TO RELATED APPLICATIONS

This application is related to U.S. patent application Ser. No. 443,726, which relates to polyol production from the reaction of polyethylene terephthalate residues with glycols and amino alcohols and U.S. patent application Ser. No. 443,726, which concerns polyols made from the base catalyzed reaction of polyethylene terephthalate and alkylene oxides, all filed of even date.

BACKGROUND OF THE INVENTION

1. Field of the Invention

The invention relates to polyols for rigid polyurethane foams and more particularly relates to aromatic amide polyols made from phthalic acid residues which impart improved fire resistance to the rigid polyurethane foams they are employed in.

2. Description of Other Relevant Compounds in the Field

It is known to prepare foam from polyurethanes by the reaction of a polyisocyanate, a polyol and a blowing agent such as a halogenated hydrocarbon, water or both, in the presence of a catalyst. One particular area of polyurethane technology is based upon rigid polyurethane foams.

The art is replete with a wide variety of polyols useful as one of the main components in preparing polyurethanes such as polyurethane foams. As an example, U.S. Pat. No. 2,965,615 suggests use of co-polymers of alkenyl-substituted aromatic compounds such as styrene, and ethylenically unsaturated monohydric alcohols such as allyl alcohol as a useful resinous polyol in urethane production. Also disclosed as useful polyol sources are alkoxylated reaction products of the above co-polymers.

Further, U.S. Pat. No. 4,094,828 describes how a polyol combination comprising a co-polymer of allyl alcohol and styrene and a polyether polyol provides for rigid polyurethane foams possessing unusual dimensional stability and heat distortion properties. Amino polyols may be modified with epoxy resin and alkylene oxides according to the invention disclosed in U.S. Pat. No. 4,309,532. These modified polyols produce rigid polyurethane foams that have higher heat distortion temperatures and better low temperature properties than foams made with polyols not modified in such a fashion.

Rigid foams generally have good insulative properties and are thus desirable for use in building insulation. As with all building materials, it is desirable to provide rigid foams that are as fire resistant as possible. One approach to this goal is to modify the polyol.

Polyisocyanurate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

Scrap polyalkylene terephthalate, such as polyethylene terephthalate (PET) is known to be incorporated into polyurethanes. For example, U.S. Pat. No. 4,048,104 relates that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where phthalic acid residues are employed is outlined in U.S. Pat. No. 4,246,365 where polyurethanes are made from polyesters containing at least two hydroxyl groups and phthalic acid residues.

More relevant to the compounds of this invention is the solution proposed in U.S. Pat. No. 4,237,238. In this patent, a polyol mixture is prepared by the transesterification of a residue from the manufacture of dimethyl terephthalate with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Hughes and John Clinton, in the Proceedings of the S.P.I. 25th Annual Urethane Division Technical Conference, Scottsdale, Ariz. (October 1979), describe other foams prepared from the polyols of U.S. Pat. No. 3,647,759.

Another type of polyisocyanurate foam employs a polyol blend using both amide diols and primary hydroxyl polyols to give a foam having a high reaction exotherm, making it particularly suited to the preparation of polyisocyanurate foam laminates, according to U.S. Pat. No. 4,246,364.

There is still a need for a rigid polyurethane foam that has a high flame resistance. Part of the problem with the polyols of U.S. Pat. No. 3,647,759 is that they are not very compatible with trichlorofluoromethane, the gas entrapped in closed-cell rigid foams, which accounts for the excellent insulating properties of these foams.

SUMMARY OF THE INVENTION

The invention concerns an aromatic polyol having amide and ester functionalities for use in preparing rigid foams, being produced by the process comprising reacting a phthalic acid residue containing ester functionalities with an amino alcohol to form a mixture containing aromatic amides and esters and subsequently reacting the amide and ester mixture with an alkylene oxide to give an aromatic polyol with amide and ester functionalities.

DETAILED DESCRIPTION OF THE PREFERRED EMBODIMENTS

In general, it has been discovered that rigid polyurethane foams having improved resistance to fire may be made using a mixture of aromatic amino polyols and the aromatic polyols of this invention. In addition, such a polyol mixture is compatible with the trichlorofluoromethane blowing agent. The novel aromatic amide polyols are made by using a phthalic acid residue. This may be any waste or scrap residue from the manufacture of phthalic acid, dimethyl terephthalate, polyethylene terephthalate and the like. The residue must contain compounds which have the moiety

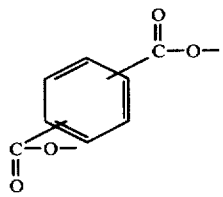

One such suitable residue is the dimethyl terephthalate (DMT) residue described in U.S. Pat. No. 3,647,759, incorporated herein by reference. However, the first co-reactant is not ethylene glycol as in U.S. Pat. No. 3,647,759, but rather an amino alcohol. The product of this reaction contains a mixture of aromatic amides and esters. This mixture is subsequently reacted with an alkylene oxide to give the novel aromatic polyol having amide and ester functionalities.

The term "DMT residue" refers to the purged residue which is obtained during the manufacture of DMT in which p-xylene is oxidized and the crude oxidation product is then esterified with methanol to yield the desired product in a reaction mixture along with a complex mixture of by-products. The desired DMT is removed from the reaction mixture with the volatile methyl p-toluate by-product by distillation leaving a residue. The DMT and methyl p-toluate are separated. Some of the residue is purged from the process while the remainder of the residue and the methyl p-toluate are recycled for oxidation. It is this purged residue which is reacted with the amino alcohols to yield useful polyol products.

U.S. Pat. No. 3,647,759 describes in detail the residue set forth above and characterizes its properties. Residues from the manufacture of polyethylene terephthalate would also be expected to be useful in making polyols by this process.

These DMT residues may contain DMT, substituted benzenes, polycarbomethoxy diphenyls, benzyl esters of the toluate family, dicarbomethoxy fluorenone, carbomethoxy benzocoumarins and carbomethoxy polyphenyls. The substituted benzenes, dicarbomethoxy fluorenone and carbomethoxy benzocoumarins are also present in small amounts. Dimethyl terephthalate may be present in amounts ranging from 6 to 60% of the DMT residue. Hercules, Inc., Wilmington, Del., sells these DMT residues under the tradename of TERATE® 101. Hercules also sells TERATE 200 series resins which are DMT resins modified with a glycol as seen in U.S. Pat. Nos. 4,237,238 and 3,647,759. Similar DMT residues having a different composition but still containing the aromatic acids are also sold by DuPont.

It is expected that useful novel aromatic polyol mixtures may be made with polyethylene terephthalate (PET) in place of the DMT residue used in the first step. The reactions would proceed as usual and an aromatic polyol having amide and ester functionalities would result.

The amino alcohols should have at least one amino group that has a reactive hydrogen and at least one hydroxyl function. Preferably, the amino alcohols can be represented by the formula

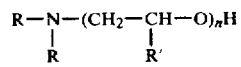

where n is an integer of from one to two, R is hydrogen or $-(CH_2-CHR')_n-OH$ and R' is hydrogen or lower alkyl of one to four carbon atoms. Especially preferred compounds include monoethanolamine, diethanolamine, isopropanolamine, diisopropanolamine and 2-(2-aminoethoxy)ethanol, also known as DI-GLYCOLAMINE® agent, sold by Texaco Chemical Company. Mixtures of amino alcohols are also suitable. The equivalents ratio of phthalic acid residue to amino alcohol in the first step should be in the range of from 3:1 to 1:3. This is the ratio of saponification equivalents of the phthalic acid residue to the amine equivalents of the amine alcohols.

The second step in the synthesis of the compounds of this invention involve the use of alkylene oxides. Virtually any alkylene oxide would work. The simpler alkylene oxides, such as ethylene oxide, propylene oxide, butylene oxide, etc. are preferred, with propylene oxide being especially preferred. Mixtures of oxides would also be useful. The proportion of alkylene oxide to be added should be enough to give the desired OH (hydroxyl) numbers.

The process for making the novel polyols of this invention may be diagrammed as follows. As noted earlier, the first step involves the reaction of the DMT residues with the amino alcohols. A mixture containing aromatic amides and esters results. The moiety R' designates the balance of the DMT and other molecules, generally.

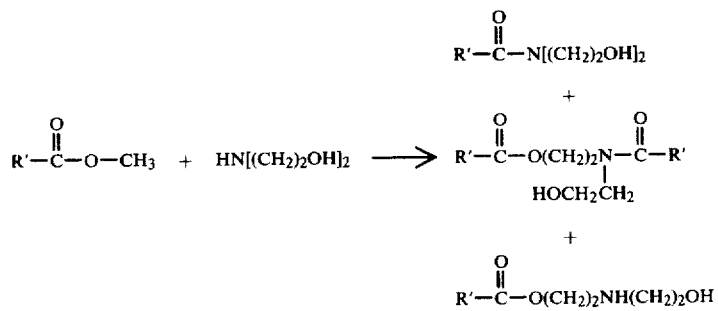

The mixture of aromatic amides and esters is next reacted with the alkylene oxide to produce the polyol. What actually forms the "polyol" of this invention is a mixture of polyols having both amide and ester functions, even though the mixture is referred to throughout as a singular "polyol".

The temperature of the first reaction should be about 130° to 250° C. and the temperature of the second step should be about 80° to 170° C. Preferably, the temperature for the first step runs from about 150° to 230° C., and the second step has a preferred temperature range of from about 100° to 150° C. Generally, both reactions need heat between ambient and 250° C. to proceed. The polyol should have a hydroxyl number in the range of 200 to 600, with an especially preferred hydroxyl number range of 300 to 500.

When these polyols are blended with conventional polyols, foams with better fire resistance are produced as compared with foams made only with the conventional polyols. The polyols of this invention can also be used to prepare isocyanurate foams which have good fire resistance.

There is better compatibility of the polyols of this invention with trichlorofluoromethane as compared with the polyols of the type preferred in U.S. Pat. No. 3,647,759. Trichlorofluoromethane, sold under the tradename FREON ® R11B, a conventional blowing agent, is the gas entrapped in closed-cell rigid foams which accounts for the excellent insulating properties of these foams.

The polyols of this invention may be used as the sole polyol component in a polyurethane foam formulation or, preferably, as part of a blend of polyols. These polyols may also be used in polyisocyanurate foams. Generally, the polyol mixtures of this invention are useful as polyol extenders and can replace to some extent more expensive polyols.

The second constituent of the overall polyol combination found particularly useful in preparing rigid polyurethane foams is a polyether polyol having a hydroxyl number of 200-800. Usually the polyether polyol comprises 0-95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2-6.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, and trimethylolpropane.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Especially preferred as the second polyol constituent are the nitrogen-containing polyether polyols described in U.S. Pat. Nos. 3,297,597 and 4,137,265, incorporated by reference herein. These particularly preferred polyols are marketed by Texaco Chemical Company as THANOL ® R-350-X and THANOL R-650-X polyols. These polyols are prepared by reacting from 2 to 3 moles of propylene oxide with one mole of the Mannich reaction product of a mole of phenol or nonylphenol with one or two moles of diethanolamine.

The final polyol combination more preferably comprises 0–95 percent by weight of said polyether polyol and 100–5 percent by weight of aromatic amide polyol. Although the aromatic polyols of this invention may be used alone, it is preferred that they be present in an amount of from 30 to 70 weight percent of the polyol blend. The polyol combination in many instances has a total hydroxyl number ranging from about 200 to about 600. A preferred range is a hydroxyl number of from 300 to 500.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyantes therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyl diisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example. The polyols of this invention are quite compatible with fluorocarbon blowing agents unlike some of the prior art polyols which are also made from DMT residues.

Surfactant agents, better known as silicone oils, are added to serve as a cell stabilizer. Some representative materials are sold under the names of SF-1109, L-520, L-521 and DC-193 which are, generally, polysiloxane polyoxyalkylene blocked co-polymers, such as those disclosed in U.S. Pat. Nos. 2,834,748; 2,917,480; and 2,846,458, for example.

Should further fire retardancy be required for the polyurethane foam, two types of fire retardants are available; those that are incorporated by mere mechanical mixing and those that become chemically bound in the polymer chain. Representative of the first type are tris(chloroethyl)phosphate, tris(2,3-dibromopropyl)phosphate, diammonium phosphate, various halogenated compounds and antimony oxide. Representative of the chemically bound type are chlorendic acid derivatives, and various phosphorous-containing polyols.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in this invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine and methyltriethylenediamine. Useful organometallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organometallic compound are often used together in the polyurethane reaction.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

In a preferred embodiment the amount of polyol combination is used such that the isocyanato groups are present in the foam in at least an equivalent amount, and preferably in slight excess, compared with the free hydroxyl groups. Preferably, the ingredients will be proportional so as to provide for about 1.05 to about 8.0 mole equivalents of isocyanato groups per mole equivalent of hydroxyl groups.

The invention will be illustrated further with respect to the following specific examples, which are given by way of illustration and not given as limitations on the scope of this invention. The synthesis of the polyols of this invention will be presented along with examples of how these polyols are used to prepare foams with improved qualities.

EXAMPLE 1

POLYOL PREPARATION

To a one liter flask equipped with a one foot Goodloe packed distilling column were charged 500 g of TERATE ® 101[1] and 341.7 g of a mixture[2] of monoethanolamine and diethanolamine. The reaction was heated to reflux while distilling off 130.6 g of material. Head temperature was less than 97° C. and the pot reached a maximum temperature of 228° C.

To a 1500 ml kettle was charged 567 g of the material left in the pot. The mixture was heated to 140° C. and 581 g of propylene oxide was added, then digested to a constant pressure. It was then cooled to 100° C. and stripped under 3 mm Hg vacuum for 30 minutes. One hundred and two grams of lights were removed by the stripping. The polyol (897 g) was then discharged from the kettle. It had a hydroxyl number of 332. The infrared analysis (IR) of the polyol showed that both esters and amides were present.

[1]Product of Hercules, Inc. having the following typical composition:

| | |
|---|---|
| Saponification number | 460 |
| Dimethyl terephthalate, % | 4 |
| Substituted benzenes, % | 5 |
| Polycarbomethoxy diphenyls, % | 30 |
| Benzyl esters of toluate family, % | 25 |
| Dicarbomethoxy fluorenone, % | 2 |
| Carbomethoxy benzocoumarins, % | 0.2 |
| Carbomethoxy polyphenyls, % | 35 |

[2]Mixture had the following composition:

| | |
|---|---|
| Monoethanolamine, wt. % | 56.5 |
| Ethylene glycol | 14.65 |
| 2-(2-aminoethoxy)ethanol | 2.9 |
| Diethanolamine | 26.1 |

EXAMPLE 2
POLYOL PREPARATION

To a two liter flask equipped as in Example 1 were placed 500 g of TERATE 101, 341.7 g of the mixture of monoethanolamine and diethanolamine in Example 1 and 200 g of dipropylene glycol. The reaction was heated to 200° C. and held for one hour. During this time 101.7 g of material distilled (maximum head temperature was 91° C.). The pot contained 926 g of material.

To a 1500 ml kettle was charged 567 g of the above material. It was heated to 135° C. and 581 g of propylene oxide was then added. After digesting to a constant pressure at 140° C., the reaction was cooled to 100° C. and placed under 4 mm Hg vacuum for 30 minutes. Seventy-three grams of material were stripped from the reaction and 1034 g of polyol was obtained. Infrared analysis showed both esters and amides were present. The polyol had a hydroxyl number of 405.

tion, retained more weight and extinguished faster than foam A which did not contain these polyols. Between foams D, E and F, which were made with a different polyol from foams A, B and C, foam E gives the best fire resistance results. The weight retained was high and it extinguished quickly compared with foams D and F. The fact that foam F showed only a slight improvement over foam D implies that in making the polyol of this invention, the glycol content should be kept as low as possible since the polyol of foam F was from Example 2, which was made using dipropylene glycol. The polyol from Example 2 is most like that of U.S. Pat. No. 3,647,759, and this series of runs demonstrates that such polyols are somewhat inferior to those of this invention. There was essentially no difference in foams G, H and I.

EXAMPLE 4
PREPARATION OF A COMPARATIVE POLYOL USING A MIXTURE OF ALIPHATIC DIACIDS

To a two liter three-necked flask equipped as in Example 2 was charged 670 g of a mixture[1] of aliphatic

| RIGID URETHANE FOAMS PREPARED USING POLYOLS FROM EXAMPLES 1 AND 2 | | | | | | | | | |
|---|---|---|---|---|---|---|---|---|---|
| Formulation, parts by weight | A | B | C | D | E | F | G | H | I |
| THANOL ® R-650-X[1] | 36.3 | 26.6 | 25.9 | — | — | — | — | — | — |
| THANOL R-350-X[2] | — | — | — | 33.1 | 24.8 | 24.2 | — | — | — |
| THANOL R-480[3] | — | — | — | — | — | — | 33.0 | 24.7 | 24.1 |
| Polyol Example 1 | — | 11.4 | — | — | 10.6 | — | — | 10.6 | — |
| Polyol Example 2 | — | — | 11.1 | — | — | 10.4 | — | — | 10.3 |
| XNS-50054.2[4] | 2.0 | 2.0 | 2.0 | 2.0 | 2.0 | 2.0 | 2.0 | 2.0 | 2.0 |
| Water | 0.3 | 0.3 | 0.3 | 0.3 | 0.3 | 0.3 | 0.3 | 0.3 | 0.3 |
| Trichlorofluoromethane | 13 | 13 | 13 | 13 | 13 | 13 | 13 | 13 | 13 |
| Silicone L-5420[5] | 0.5 | 0.5 | 0.5 | 0.5 | 0.5 | 0.5 | 0.5 | 0.5 | 0.5 |
| FOMREZ ® UL-32[6] | 0.01 | 0.01 | 0.01 | 0.01 | 0.01 | 0.01 | 0.02 | 0.02 | 0.02 |
| THANCAT ® TD-20[7] | — | — | — | — | — | — | 0.20 | 0.20 | 0.20 |
| MONDUR ® MR[8] | 47.9 | 46.2 | 47.3 | 51.1 | 48.8 | 49.7 | 51.0 | 48.7 | 49.6 |
| NCO/OH index | 1.1 | 1.1 | 1.1 | 1.1 | 1.1 | 1.1 | 1.1 | 1.1 | 1.1 |
| Reaction Profile | | | | | | | | | |
| Cream time (sec) | 16 | 14 | 15 | 18 | 15 | 16 | 19 | 15 | 15 |
| Gel time (sec) | 47 | 51 | 55 | 56 | 51 | 61 | 68 | 58 | 54 |
| Tack free time (sec) | 69 | 75 | 81 | 86 | 78 | 85 | 111 | 85 | 89 |
| Rise time (sec) | 108 | 114 | 110 | 116 | 104 | 114 | 134 | 114 | 110 |
| Physical Properties | | | | | | | | | |
| Density, pcf | 1.74 | 1.73 | 1.69 | 1.65 | 1.64 | 1.63 | 1.70 | 1.68 | 1.68 |
| K-factor | 0.13 | 0.12 | 0.12 | — | 0.12 | 0.12 | 0.13 | 0.12 | 0.12 |
| Compressive strength | | | | | | | | | |
| with rise, psi | 39 | 37 | 35 | 40 | 38 | 36 | 27 | 33 | 31 |
| cross rise, psi | 14 | 9 | 9 | 13 | 12 | 9 | 13 | 9 | 9 |
| Friability, wt. % loss | 5 | 2 | 4 | 3 | 3 | 4 | 9 | 5 | 6 |
| Heat distortion, °C. | 169 | 155 | 152 | 172 | 157 | 156 | 191 | 188 | 189 |
| Closed cells, % | 92.2 | 88.7 | 91.5 | 92.8 | 91.9 | 91.6 | 89.0 | 89.7 | 91.8 |
| Butler Chimney | | | | | | | | | |
| wt. % retained | 36 | 67 | 67 | 50 | 70 | 55 | 38 | 42 | 39 |
| seconds to extinguish | 41 | 18 | 13 | 23 | 14 | 18 | 29 | 29 | 29 |
| flame height, inches | >11 | >11 | >11 | >11 | >11 | >11 | >11 | >11 | >11 |
| Dimensional Stabilities | | | | | | | | | |
| 1 week | | | | | | | | | |
| 159° F./100% rel. humidity | | | | | | | | | |
| Δ vol. % | +6 | +6 | +7 | +2 | +4 | +4 | +6 | +8 | +5 |
| Δ wt. % | −1 | −1 | −1 | −1 | 0 | −1 | −2 | −1 | −1 |
| Δ lin. % | +2 | +3 | +4 | +1 | +2 | +2 | +4 | +3 | +3 |
| 200° F./dry | | | | | | | | | |
| Δ vol. % | +9 | +5 | +9 | +4 | +4 | +4 | +6 | +5 | +5 |
| Δ wt. % | −1 | −1 | 0 | 0 | 0 | 0 | −1 | 0 | 0 |
| Δ lin. % | +3 | +3 | +3 | +2 | +2 | +2 | +4 | +3 | +3 |

[1] An aromatic-amino polyol, hydroxyl number about 450, sold by Texaco Chemical Co.
[2] An aromatic-amino polyol, hydroxyl number 530, sold by Texaco Chemical Co.
[3] A sucrose-amino polyol, hydroxyl number 530, sold by Texaco Chemical Co.
[4] A fire retardant sold by Dow Chemical Co.
[5] A silicone surfactant sold by Union Carbide Corp.
[6] A tin catalyst sold by Witco Chemical Corp.
[7] 80 wt. % dimethylamine, 20 wt. % triethylenediamine sold by Texaco Chemical Co.
[8] A polymeric isocyanate sold by Mobay Chemical Corp.

Comparison of foams A, B and C reveals a difference in the Butler Chimney test results for flammability. Foams B and C, which used the polyols of this invendiacids. To this mixture was added 833 g of the mixture of monoethanolamine and diethanolamine used in Example 1. The reaction was then heated to 180° C. for two hours. There were 180 ml distilled during these two hours. The product had a hydroxyl number of 601 and an acid number of 11.35.

[1] The mixture of aliphatic acid contained mainly glutaric acid (about 58 wt.%), succinic acid (about 25 wt.%) and adipic acid (about 14 wt.%).

To a 1500 ml kettle was charged 685 g of the above material. It was heated to 120° C. and 363.6 g of propylene oxide was added. After a constant pressure had been obtained the reaction was cooled to 105° C. and stripped at 5 mm Hg vacuum for one-half hour. The resulting polyol had the following properties: hydroxyl number 504, acid number 0.53.

This example produced polyols somewhat similar to those seen in U.S. Pat. No. 4,246,364. Example 5 will demostrate that such aliphatic amide polyols are inferior to the aromatic amide polyols of this invention.

N and O. It did not provide a good foam in either example, while under the same conditions the polyols of this invention gave excellent foams in foam runs J, K, L and M.

Many modifications may be made in the polyols of this invention and their method of production without departing from the spirit and the scope of the invention which is defined only in the appended claims. For example, it may be found that polyols made from a certain kind a phthalic acid residue or made at a certain temperature would have advantageous properties.

We claim:

1. An aromatic polyol having amide and ester functionalities for use in preparing rigid foams, being produced by the process comprising
   a. reacting a phthalic acid residue containing ester functionalities with an amino alcohol to form a mixture containing amides and esters, and

| | PREPARATION OF ISOCYANURATE FOAMS | | | | | |
|---|---|---|---|---|---|---|
| Formulation, pbw | J | K | L | M | N | O |
| B-component | | | | | | |
| Polyol Example 1 | 16.3 | — | 17.4 | — | — | — |
| Polyol Example 2 | — | 15.9 | — | 14.8 | — | — |
| Polyol Example 4 | — | — | — | — | 11.5 | 12.3 |
| Silicone DC-193[1] | 0.5 | 0.5 | 0.5 | 0.5 | 0.5 | 0.5 |
| DABCO ® TMR-2[2] | 1.5 | 1.5 | 1.0 | 1.0 | 1.5 | 1.0 |
| Trichlorofluoromethane | — | — | 12.5 | 12.5 | — | 12.5 |
| A-component | | | | | | |
| Trichlorofluoromethane | 13.2 | 13.2 | — | — | 13.2 | — |
| PAPI ® 580[3] | 68.5 | 70.9 | — | — | 73.2 | — |
| MONDUR ® MR[4] | — | — | 68.6 | 71.2 | — | 73.7 |
| Reaction Profile | | | | | | |
| Cream time, sec | 13 | 15 | 16 | 15 | 28 | 41 |
| Gel time, sec | 22 | — | — | — | — | |
| Tack free time, sec | 28 | 26 | 28 | 28 | — | |
| Rise time, sec | 59 | 62 | 67 | 60 | rose only half way | >310 not a good foam |
| Physical Properties | | | | | | |
| Density, pcf | 1.95 | 2.01 | 2.15 | 2.14 | | |
| K-factor | 0.11 | 0.11 | 0.11 | 0.12 | | |
| Closed cells, % | 90 | 90.7 | 88.1 | 88.0 | | |
| Compressive strength | | | | | | |
| with rise, psi | 28 | 36 | 42 | 41 | | |
| cross rise, psi | 10 | 12 | 13 | 16 | | |
| Friability, wt. % loss | 16 | 19 | 33 | 16 | | |
| Heat distortion, °C. | >225 | >225 | >225 | >225 | | |
| Butler Chimney | | | | | | |
| Wt. % retained | 93 | 93 | 93 | 93 | | |
| Seconds to extinguish | 10.7 | 10.5 | 11.0 | 10.7 | | |
| Flame height | 5.5 | 5.3 | 5.3 | 6.5 | | |
| Dimensional Stabilities | | | | | | |
| 1 week | | | | | | |
| 158° F./100% Rel. Humidity | | | | | | |
| Δ vol. % | +13 | +9 | +8 | +5 | | |
| Δ wt. % | −5 | −4 | −3 | −3 | | |
| Δ lin. % | +9 | +5 | +4 | +3 | | |
| 200° F./dry | | | | | | |
| Δ vol. % | +11 | +7 | +4 | +4 | | |
| Δ wt. % | −3 | −2 | −2 | −2 | | |
| Δ lin. % | +8 | +4 | +3 | +2 | | |
| 20° F./dry | | | | | | |
| Δ vol. % | −11 | −8 | −20 | −3 | | |
| Δ wt. % | 0 | 0 | 0 | −1 | | |
| Δ lin. % | −7 | −5 | −3 | −2 | | |

[1] A silicone surfactant sold by Dow-Corning Corp.
[2] A product of Air Products and Chemicals, Inc.
[3] A polymeric isocyanate sold by Upjohn Co.
[4] A polymeric isocyanate sold by Mobay Chemical Corp.

A polyol from Example 4 prepared in the same manner as the polyols of Examples 1 and 2, but using an aliphatic dicarboxylic acid mixture instead of an aromatic polycarboxylic acid mixture, was used for foams b. subsequently reacting the amide and ester mixture with an alkylene oxide to give an aromatic polyol having amide and ester functionalities.

2. The aromatic polyol of claim 1 in which the phthalic acid residue is polyethylene terephthalate residue.

3. The aromatic polyol of claim 2 in which the amino alcohol has the formula

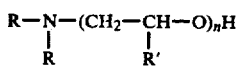

where R is —$(CH_2—CHR')_n$—OH or hydrogen, R' is hydrogen or lower alkyl of one to four carbon atoms and n is one or two.

4. The aromatic polyol of claim 3 in which the amino alcohol is chosen from the group consisting of monoethanolamine, diethanolamine, isopropanolamine, diisopropanolamine, 2-(2-aminoethoxy)ethanol and mixtures thereof.

5. The aromatic polyol of claim 2 in which the alkylene oxide is selected from the group consisting of ethylene oxide, propylene oxide, butylene oxide and mixtures thereof.

6. The aromatic polyol of claim 2 in which the reactions to make the polyol are conducted at a temperature in the range between ambient and 250° C. and at a pressure between atmospheric and 500 psi.

7. The aromatic polyol of claim 6 in which the first reaction is conducted at a temperature between 150° and 230° C. and the second reaction is conducted at a temperature in the range of 100° to 150° C.

8. The aromatic polyol of claim 2 in which the resulting aromatic polyol has a hydroxyl number between 200 and 600.

9. An aromatic polyol having amide and ester functionalities for use in preparing rigid foams, being produced by the process comprising
  a. reacting polyethylene terephthalate residue with an amino alcohol selected from the group consisting of monoethanolamine, diethanolamine, isopropanolamine, diisopropanolamine, 2-(2-aminoethoxy)ethanol and mixtures thereof by heating to a reflux temperature between 150° and 230° C. at a pressure between atmospheric and 500 psi,
  b. distilling off the light components,
  c. recovering a bottoms product comprising a mixture containing aromatic amides and esters,
  d. subsequently reacting the amide and ester mixture with an alkylene oxide selected from the group consisting of ethylene oxide, propylene oxide, butylene oxide and mixtures thereof, by heating the reactants to a temperature between 100° and 150° C. at a pressure between atmospheric and 500 psi,
  e. distilling off the light components, and
  f. recovering a bottoms product comprising an aromatic polyol having amide and ester functionalities and a hydroxyl number between 200 and 600.

10. An aromatic polyol having amide and ester functionalities for use in preparing rigid foams, being produced by the process comprising
  a. reacting a residue from the manufacture of dimethyl terephthalate with an amino alcohol to form a mixture containing aromatic amides and esters, and
  b. subsequently reacting the amide and ester mixture with an alkylene oxide to give an aromatic polyol having amide and ester functionalities.

11. The aromatic polyol of claim 10 in which the dimethyl terephthalate residue comprises dimethyl terephthalate, substituted benzenes, polycarbomethoxy diphenyls, benzyl esters of the toluate family, dicarbomethoxy fluorenone, carbomethoxy benzocoumarins and carbomethoxy polyphenyls.

12. The aromatic polyol of claim 10 in which the amino alcohol has the formula

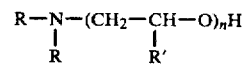

where R is —$(CH_2—CHR')_n$—OH or hydrogen, R' is hydrogen or lower alkyl of one to four carbon atoms and n is one or two.

13. The aromatic polyol of claim 12 in which the amino alcohol is chosen from the group consisting of monoethanolamine, diethanolamine, isopropanolamine, diisopropanolamine, 2-(2-aminoethoxy)ethanol and mixtures thereof.

14. The aromatic polyol of claim 10 in which the reactions to make the polyol are conducted at a temperature in the range between ambient and 250° C. and at a pressure between atmospheric and 500 psi.

15. The aromatic polyol of claim 10 in which the alkylene oxide is selected from the group consisting of ethylene oxide, propylene oxide, butylene oxide and mixtures thereof.

16. The aromatic polyol of claim 10 in which the resulting aromatic polyol reaction product has a hydroxyl number between 200 and 600.

17. An aromatic polyol having amide and ester functionalities for use in preparing rigid foams, being produced by the process comprising
  a. reacting a residue from the manufacture of dimethyl terephthalate comprising dimethyl terephthalate, substituted benzenes, polycarbomethoxy diphenyls, benzyl esters of the toluate family, dicarbomethoxy fluorenone, carbomethoxy benzocoumarins and carbomethoxy polyphenyls, with an amino alcohol selected from the group consisting of monoethanolamine, diethanolamine, isopropanolamine, diisopropanolamine, 2-(2-aminoethoxy) ethanol and mixtures thereof by heating to a reflux temperature between 150° and 230° C. at a pressure between atmospheric and 500 psi,
  b. distilling off the light components,
  c. recovering a bottoms product comprising a mixture containing aromatic amides and esters,
  d. subsequently reacting the amide and ester mixture with an alkylene oxide selected from the group consisting of ethylene oxide, propylene oxide, butylene oxide and mixtures thereof, by heating the reactants to a temperature between 100° and 150° C. at a pressure between atmospheric and 500 psi,
  e. distilling off the light components, and
  f. recovering a bottoms product comprising an aromatic polyol having amide and ester functionalities having a hydroxyl number between 200 and 600.

18. A polyol blend composition comprising
  a. from about 5 to 100 percent by weight of a mixture of aromatic amide polyols which are the reaction product from
    (1) reacting a residue from the manufacture of dimethyl terephthalate with an amino alcohol to form a mixture containing aromatic amides and esters, and
    (2) subsequently reacting the amide and ester mixture with an alkylene oxide, and b. from about 95 to 0 percent by weight of a nitrogen-containing polyol which is the reaction product from
   (1) reacting one mole of phenol or nonylphenol with one to two moles of ethanolamine to give a Mannich reaction product, and
   (2) subsequently reacting one mole of the Mannich reaction product with 2 to 3 moles of propylene oxide.

19. The polyol blend composition of claim 18 in which the overall composition has an average hydroxyl number of from 200 to 600.

20. A method for making a mixture of aromatic polyols having amide and ester functionalities for use in preparing rigid foams, comprising
   a. reacting a residue from the manufacture of dimethyl terephthalate with an amino alcohol to form a mixture containing aromatic amides and esters, and
   b. subsequently reacting the amide and ester mixture with an alkylene oxide to give an aromatic polyol mixture having amide and ester functionalities.

21. The method of claim 20 in which the dimethyl terephthalate residue comprises dimethyl terephthalate, substituted benzenes, polycarbomethoxy diphenyls, benzyl esters of the toluate family, dicarbomethoxy fluorenone, carbomethoxy benzocoumarins and carbomethoxy polyphenyls.

22. The method of claim 20 in which the amino alcohol has the formula

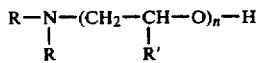

where R is hydrogen or $-(CH_2-CHR')_n-OH$, R' is hydrogen or lower alkyl of one to four carbon atoms and n is 1 or 2.

23. The method of claim 22 in which the amino alcohol is chosen from the group consisting of monoethanolamine, diethanolamine, isopropanolamine, diisopropanolamine, 2-(2-aminoethoxy)ethanol and mixtures thereof.

24. The method of claim 20 in which the reactive steps are carried out at a temperature in the range between ambient and 250° C. and at a pressure between atmospheric and 500 psi.

25. The method of claim 20 in which the alkylene oxide is selected from the group consisting of ethylene oxide, propylene oxide, butylene oxide and mixtures thereof.

26. The method of claim 20 in which the resulting aromatic polyol reaction product has a hydroxyl number between 200 and 600.

27. A method for the production of a mixture of aromatic polyols having amide and ester functionalities for use in preparing rigid foams comprising
   a. reacting a residue from the manufacture of dimethyl terephthalate comprising dimethyl terephthalate, substituted benzenes, polycarbomethoxy diphenyls, benzyl esters of the toluate family, dicarbomethoxy fluorenone, carbomethoxy benzocoumarins and carbomethoxy polyphenyls, with an amino alcohol mixture comprising one or more of the group consisting of monoethanolamine, diethanolamine, isopropanolamine, diisopropanolamine, 2-(2-aminoethoxy)ethanol and mixtures thereof by heating to a reflux temperature between 150° and 230° C. at a pressure between atmospheric and 500 psi,
   b. distilling off the light components,
   c. recovering a bottoms product comprising a mixture containing aromatic amides and esters,
   d. subsequently reacting the amide and ester mixture with an alkylene oxide selected from the group consisting of ethylene oxide, propylene oxide, butylene oxide and mixtures thereof, by heating the reactants to a temperature between 100° and 150° C. at a pressure between atmospheric and 500 psi,
   e. distilling off the light components,
   f. recovering a bottoms product comprising an aromatic polyol having amide and ester functionalities having a hydroxyl number between 200 and 600.

28. A rigid polyurethane foam obtained by reacting in the presence of a blowing agent and a catalyst of polyurethane formation, an organic polyisocyanate and a polyol blend comprising
   a. from about 5 to 100 percent by weight of a mixture of aromatic polyols having amide and ester functionalities which are the reaction product from
      (1) reacting a residue from the manufacture of dimethyl terephthalate with an amino alcohol to form a mixture containing aromatic amides and esters, and
      (2) subsequently reacting the amide and ester mixture with an alkylene oxide, and
   b. from about 95 to 0 percent by weight of a nitrogen-containing polyol which is the reaction product from
      (1) reacting one mole of phenol or nonylphenol with one to two moles of ethanolamine to give a Mannich reaction product, and
      (2) subsequently reacting one mole of the Mannich reaction product with 2 to 3 moles of propylene oxide.

29. The rigid polyurethane foam of claim 28 in which the polyol blend has a hydroxyl number in the range from 200 to 600.

30. The rigid polyurethane foam of claim 28 in which the blowing agent is trichlorofluoromethane.

31. A rigid foam in which the major recurring polymer unit is isocyanurate, which foam is obtained by reacting in the presence of a blowing agent and a trimerization catalyst of polyisocyanurate formation, an organic polyisocyanate and an aromatic polyol having amide and ester functionalities which is the reaction product of
   a. a first reaction of a residue from the manufacture of dimethyl terephthalate with an amino alcohol to form a mixture containing aromatic amides and esters, and
   b. a second, subsequent reaction of the amide and ester mixture with enough alkylene oxide so that the resulting aromatic polyol which has amide and ester functionalities has a hydroxyl number in the range from 200 to 600.

32. The rigid polyisocyanurate foam of claim 31, in which the blowing agent is trichlorofluoromethane.

* * * * *